V. HOWARD & J. P. WRIGLEY.
CHANGEABLE HEADLIGHT.
APPLICATION FILED MAR. 6, 1913.

1,080,110.

Patented Dec. 2, 1913.

2 SHEETS—SHEET 1.

WITNESSES:

F. C. Fliedner
Genevieve Ball.

INVENTORS
Victor Howard
James P. Wrigley
BY
Francis M. Wright,
ATTORNEY

V. HOWARD & J. P. WRIGLEY.
CHANGEABLE HEADLIGHT.
APPLICATION FILED MAR. 6, 1913.
1,080,110.
Patented Dec. 2, 1913.
2 SHEETS—SHEET 2.
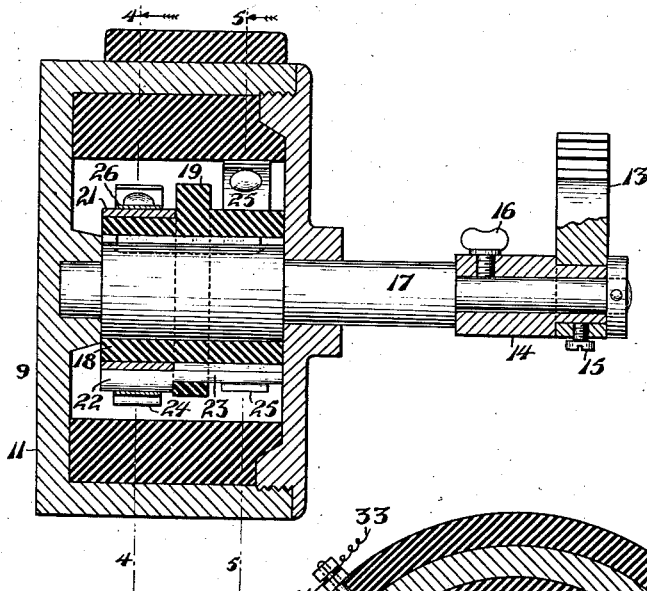
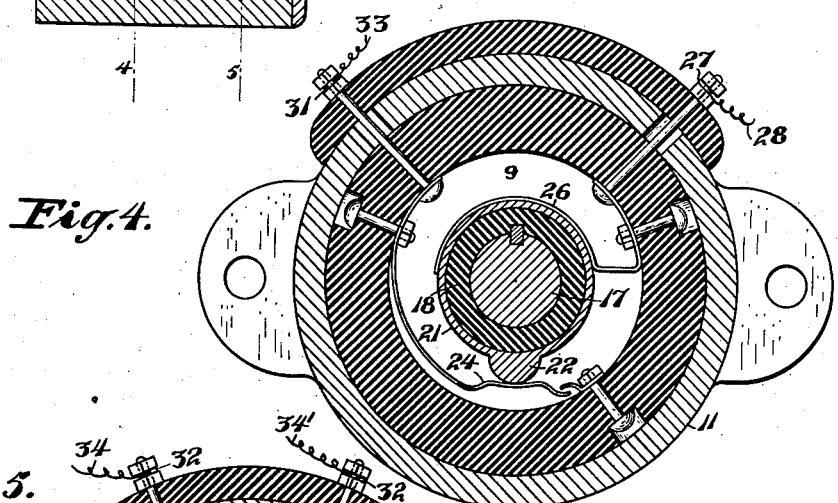
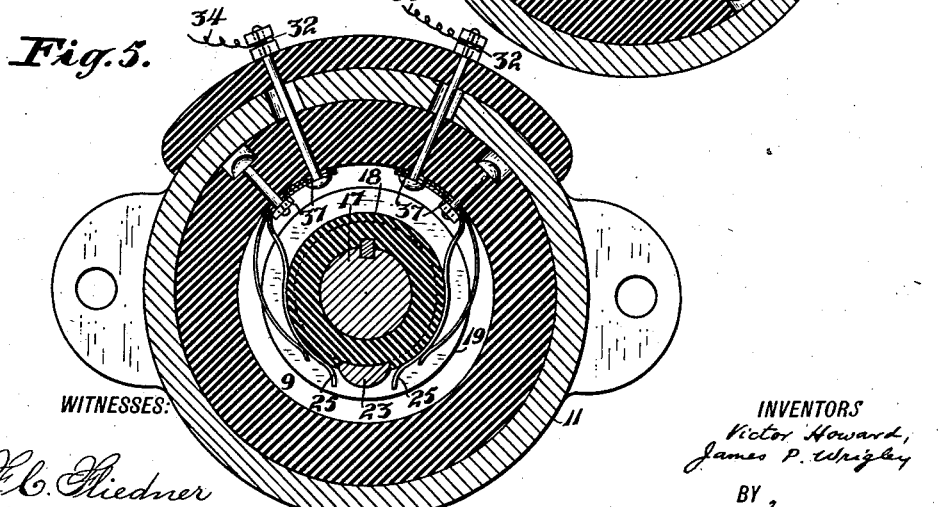
WITNESSES:
INVENTORS
Victor Howard,
James P. Wrigley
BY
Francis K. Wright,
ATTORNEY

UNITED STATES PATENT OFFICE.

VICTOR HOWARD AND JAMES P. WRIGLEY, OF OAKLAND, CALIFORNIA.

CHANGEABLE HEADLIGHT.

1,080,110.  Specification of Letters Patent.  Patented Dec. 2, 1913.

Application filed March 6, 1913. Serial No. 752,380.

*To all whom it may concern:*

Be it known that we, VICTOR HOWARD and JAMES P. WRIGLEY, citizens of the United States, residing at Oakland, in the county of Alameda and State of California, have invented new and useful Improvements in Changeable Headlights, of which the following is a specification.

In traveling in a sharp curve, or turning a corner, the head-light of an automobile, fixedly secured upon its body, does not illuminate the path over which the wheels are traveling.

It is the object of our invention to provide means for remedying this defect.

Figure 1:
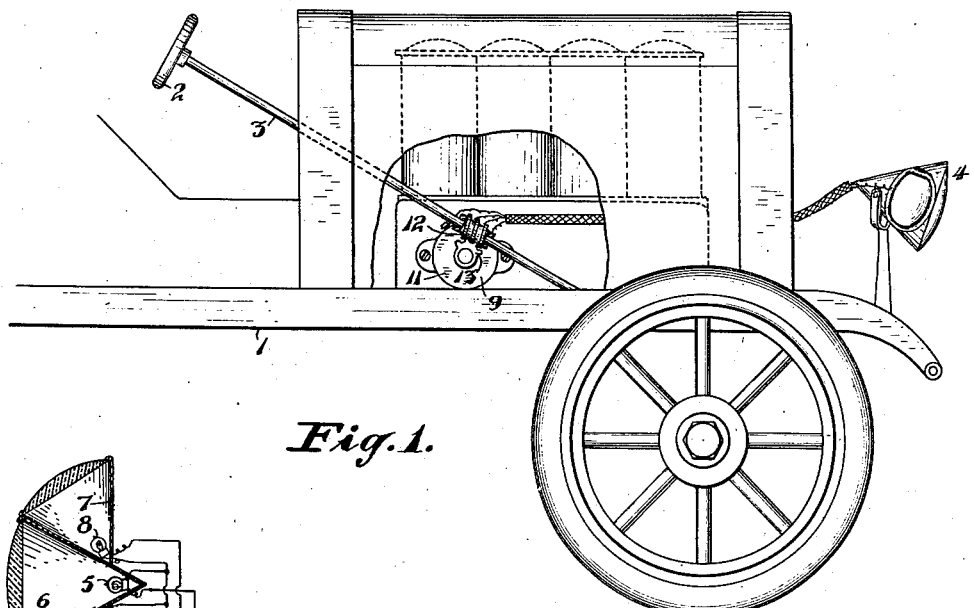
Figure 2:
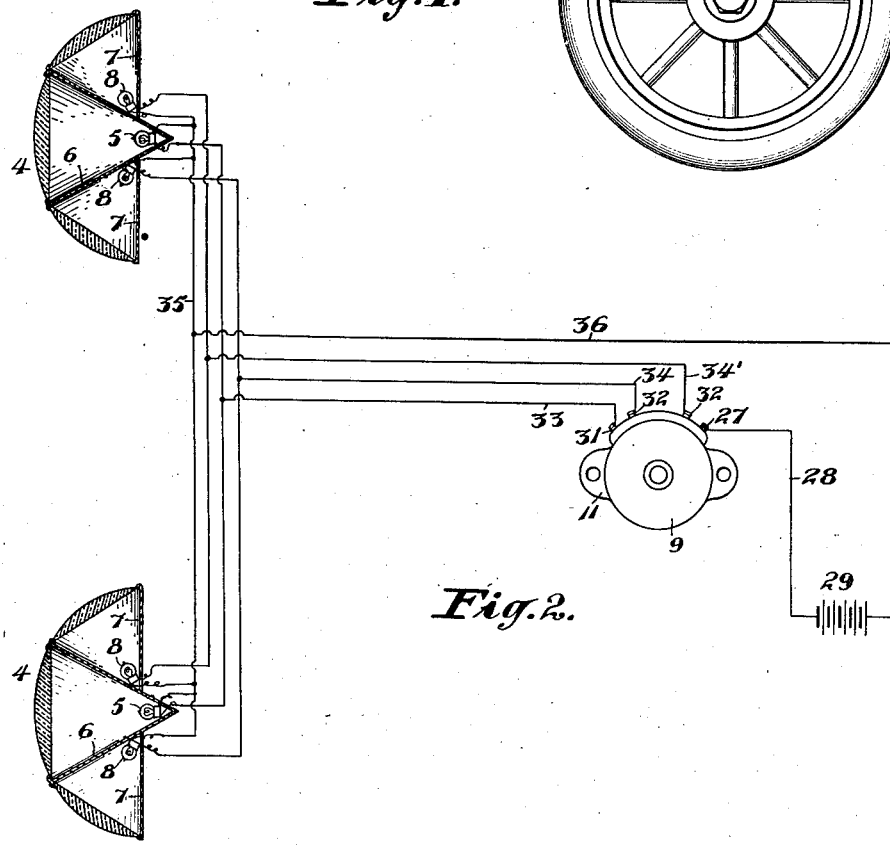

In the accompanying drawing, Figure 1 is a side view of the front portion of an automobile equipped with our invention, parts unnecessary thereto being omitted; Fig. 2 is a diagrammatic view of the electrical connections; Fig. 3 is an enlarged sectional view of the switch for making said connections; Figs. 4 and 5 are sections on the line 4—4, 5—5, respectively, of Fig. 3.

Referring to the drawing, 1 indicates the body of an automobile, 2 the steering wheel, and 3 the steering post thereof. Two head-lights 4 are here shown, although our invention is equally applicable to a single head-light, and instead of confining each head-light to a single electric lamp 5, and reflector 6, we provide in each head-light, in addition to the central reflector 6, side reflectors 7 and electric lamps 8 therefor, said side reflectors directing the light at an angle of 45 degrees, to the right and left respectively, of the direction of the light from the central reflector. The reflectors of each head-light are all comprised in the same casing, and are each in the general form of a cone somewhat flat at the top, and are stationarily secured upon the frame of the car, but only one lamp in each head-light is illuminated at any time, the central lamp 5 being illuminated when the car is traveling straight ahead or approximately so, the right hand lamp when traveling to the right, and the left hand lamp when traveling to the left. To accomplish this result we provide an electric switch 9 automatically operated with the turning of the steering wheels, the construction of which is as follows:—11 indicates a casing secured to the body of the car at any suitable point, preferably in a position in which the switch can be directly geared to the steering post 3. Upon said steering post is formed a worm 12 which meshes with a worm segment 13 secured by a screw 15 on a sleeve 14, surrounding a shaft 17 and secured by a screw 16 to said shaft. Upon said shaft 17 within said casing is secured a sleeve 18 of insulating material formed with a central annular rib 19. Around said sleeve on one side of said rib extends a metallic ring 21 having a projection 22. Said projection 22 is formed with a lateral extension 23 passing through a hole in said rib 19 to its other side. The connection of the shaft 17 with the steering post is such that when the car is traveling straight ahead, the projection 22 and extension 23 are in the central or lowermost position, in which the projection 22 is in contact with a spring electric contact 24, and the extension 23 is out of contact with two spring electric contacts 25. The ring 21 is always in electrical contact with an arcuate spring 26, connected to a binding post 27, to which is connected a wire 28 leading to one side of the source 29 of supply of electricity, while the spring contacts 24, 25 are connected to binding posts 31, 32, connected by wires 33, 34, 34', leading through the several lamps, or through them in parallel, if there are a plurality of head-lights, wires 35, 36 leading therefrom to the other side of said source. In the straight-ahead position of the car, the projection 22 contacts with the contact 24, and the current flows through the central lamp of the head-light. But, on turning the steering wheel through a sufficient angle to one side the projection 22 breaks contact with the spring contact 24, and the extension 23 makes contact with one or the other of the spring contacts 25, and a current flows through one or the other of the side lamps of the head-light or head-lights. On returning to the straight-ahead position the side lamps are extinguished and the central lamps are again illuminated. The contacts 25 can be adjusted by means of slots 37 therein so as to make connection with the projection 22 and extensions 23 at any point desired. The connections with the contact for the central light and for the side lights coincide to a small extent, so as to prevent darkness in passing from one light to the other.

We claim:—

In combination with automobile steering mechanism central and side electric lamps, individual reflectors for the several lamps, the reflector for the central lamp directing the light straight ahead, and the reflectors for the side lamps directing the light at an angle with the direction by the central reflector, a circuit for each lamp, and means, operated automatically with the operation of said steering mechanism, for breaking the circuit through one of the lamps and closing that through another lamp.

In testimony whereof we have hereunto set our hands in the presence of two subscribing witnesses.

VICTOR HOWARD.
JAMES P. WRIGLEY.

Witnesses:
FRANCIS M. WRIGHT,
D. B. RICHARDS.